United States Patent

Kruse et al.

[11] 4,074,965
[45] Feb. 21, 1978

[54] STABLE MONOAZO DYESTUFF

[75] Inventors: Hubert Kruse, Kelkheim, Taunus; Karl Sommer, Konigstein, Taunus, both of Germany

[73] Assignee: Hoechst Aktiengesellschaft, Frankfurt am Main, Germany

[21] Appl. No.: 684,088

[22] Filed: May 7, 1976

[30] Foreign Application Priority Data

May 9, 1975   Germany ............................ 2520577

[51] Int. Cl.$^2$ ..................... C09B 27/00; C07C 107/00
[52] U.S. Cl. ........................................... 8/41 R; 8/76; 8/79; 8/82; 8/83; 8/89 R; 8/90; 8/93; 260/207.5; 260/208
[58] Field of Search ...................... 8/41 R, 79, 82, 83, 8/41 R, 76; 260/208, 207.5

[56]           References Cited
          U.S. PATENT DOCUMENTS 2,007,386   7/1965   Stanley et al. ............................. 8/76

FOREIGN PATENT DOCUMENTS 471,923   9/1937   United Kingdom.

Primary Examiner—A. Lionel Clingman

Attorney, Agent, or Firm—Curtis, Morris & Safford

[57]           ABSTRACT

The modification being stable under dyeing conditions of the dyestuff of the formula characterized by an X-ray diffraction diagram with characteristic reflexes at the following glance angles $\theta$ with the relative intensities as given below:

| [o] | 2.45 | 6.30 | 10.07 | 11.00 | 11.35 | 11.70 | 12.36 | 13.55 | 14.80 | 15.85 |
|---|---|---|---|---|---|---|---|---|---|---|
| | 63 | 100 | 30 | 48 | 83 | 88 | 86 | 59 | 52 | 34 | said modification in the form of a liquid or solid dyeing preparation being suitable for the dyeing of fibrous materials consisting of cellulose esters or synthetic linear polyesters.

4 Claims, 2 Drawing Figures

STABLE MONOAZO DYESTUFF

The present invention relates to a stable monoazo dyestuff.

The present invention provides a novel stable crystallographic modification ("β-modification") of the dyestuff of the formula

Figure 1:
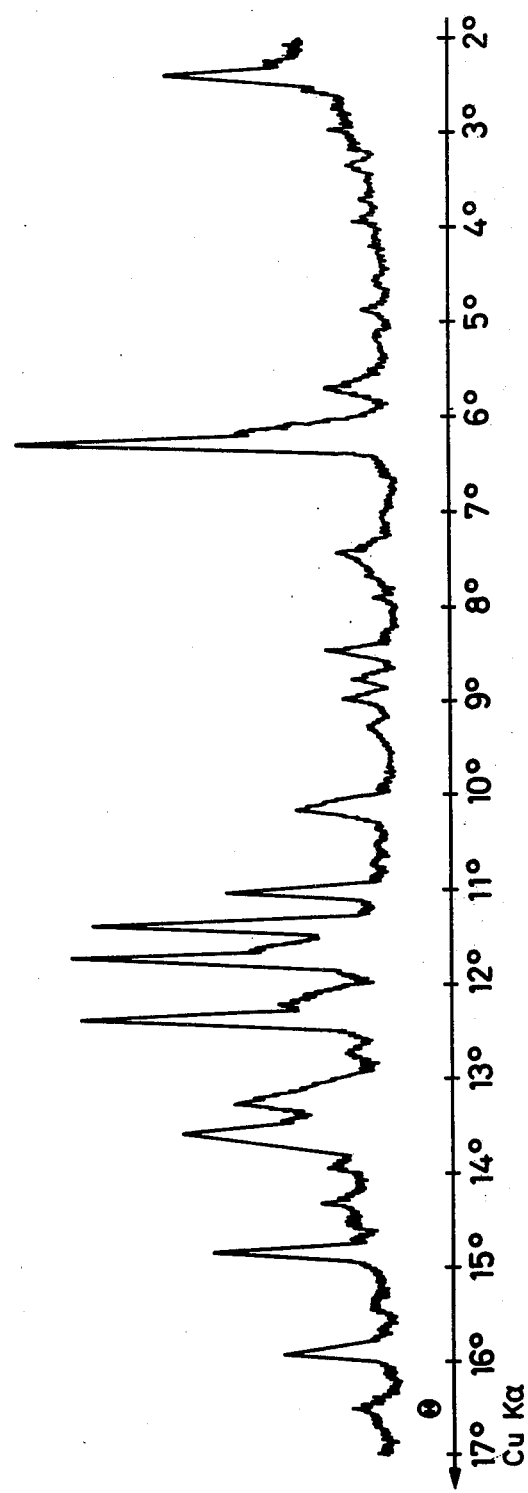

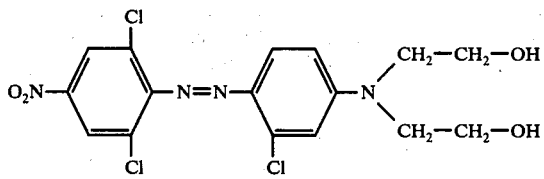

which has the X-ray diffraction diagram shown in FIG. 1 with the characteristic reflexes at the following glance angles θ (CuK α-radiation) and the intensities indicated.

| [o] | 2.45 | 6.30 | 10.07 | 11.00 | 11.35 | 11.70 | 12.36 | 13.55 | 14.80 | 15.85 |
|---|---|---|---|---|---|---|---|---|---|---|
| relative intensity | 63 | 100 | 30 | 48 | 83 | 88 | 86 | 59 | 52 | 34 |

The dyestuff of the formula mentioned above may be prepared according to Example 4 of British Pat. No. 471,923, in which process it is obtained in the α-modification which does not have a sufficient stability under the conditions found in the practice of dyeing. The α-modification shows the X-ray diffraction diagram illustrated in FIG. 2 with the characteristic reflexes at the following glance angles θ (CuK α-radiation) with the intensities indicated:

| [o] | 2.55 | 5.60 | 6.20 | 7.65 | 12.35 | 13.40 |
|---|---|---|---|---|---|---|
| relative intensity | 78 | 40 | 59 | 30 | 38 | 100 |

Under dyeing conditions, such as high temperature, and in the presence of dyeing auxiliaries, the β-modification is practically changed no more with regard to the crystal size and the crystal form, so that the dyeing properties and the stability of the dispersion are not adversely affected in this process, as compared against the α-modification.

The novel β-modification stable under dyeing conditions can be obtained by heating an aqueous suspension of the α-modification, for a period of from 1 to 10 hours, possibly under pressure, at a temperature of from 60° to 150° C, preferably from 80° to 120° C.

It is also possible to obtain the β-modification by heating the α-modification in organic solvents, such as alcohols, for example ethanol or butanol, ethers, such as dioxan, or glycols or glycol ethers, at a temperature in the range of from 60° to about 20° C below the boiling temperature of the respective solvent, however, not exceeding 150° C. Besides, the β-modification can be obtained by drying the α-modification at a temperature of from 100° to 120° C.

The conversion into the stable β-modification is also effected by heating the α-modification in an aqueous suspension, while adding water-soluble organic solvents, for example alcohols, such as methanol, ethanol, butanol, glycols or glycol ethers, acetone or dimethylformamide, within a temperature range, the lower limit of which is 60° C, and the upper limit of which is given by the composition of the mixture of water and organic solvent, but is not to exceed 150° C.

Furthermore, the β-modification is obtained by heating an aqueous suspension of the α-modification, while adding anionic, cationic or non-ionic surface-active compounds, at a temperature in the range of from 60° to about 100° C. Suitable surface-active compounds for this purpose are, for example, diisobutylnaphthalene-sulfonic acid sodium, the addition product of 25 moles of ethylene oxide to 1 mole of stearyl alcohol, a mixture of alkyl-dimethylbenzyl-ammonium chlorides, a fatty acid-polyglycol ester or tertiary organic phosphoric acid esters of the addition product of 2 moles of ethylene oxide to 1 mole of lauryl alcohol.

Finally, the β-modification may be obtained by grinding the α-modification, while adding common dispersing agents, for example alkylated naphthalene-sulfonic acids, polyvinylsulfonates, condensation products of naphthalene-sulfonic acid and formaldehyde or of phenol and formaldehyde, alkali metal salts of lignin sulfonates or sulfite cellulose waste liquor, at a temperature in the range of from about 80° to 90° C.

The β-modification is separated, for example, by filtration from the liquid phase and is subjected to a known finish, while adding dispersing agents, for example alkylated naphthalene-sulfonic acids, polyvinylsulfonates, condensation products of naphthalene-sulfonic acid and formaldehyde or of phenol and formaldehyde, alkali metal salts of lignin sulfonates or sulfite cellulose waste liquor, at the common temperatures which do not exceed 60° C. For the fine division, use may be made of the conventional devices, such as ball mills or sand mills.

The liquid or pulverulent compositions thus obtained of the stable β-modification are suitable in an unrestricted way - in contradistinction to comparable compositions of the α-modification - for the dyeing of textile materials of cellulose esters or synthetic linear polyesters, such as polyethylene-glycol terephthalate, at a temperature in the range of from 100° to 220° C. The stable compositions do not flocculate in an aqueous medium and under the action of high temperatures, which is particularly important for the dyeing of wound packages, for example cross-wound bobbins, and they yield better test results in different dyeing tests performed.

FIG. 1: X-ray diffraction diagram: β-modification of dyestuff.

Figure 2:
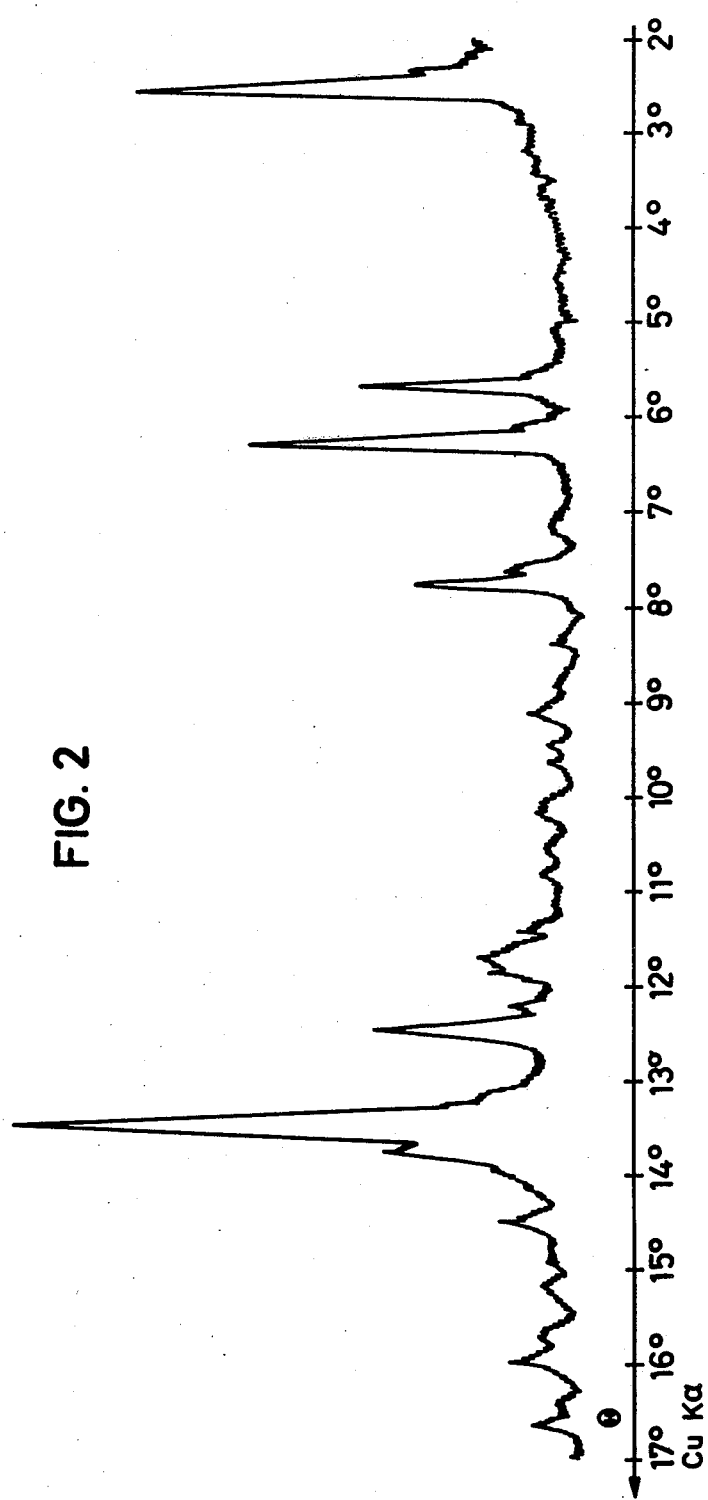

FIG. 2: X-ray diffraction diagram: α-modification of dyestuff.

The following Examples serve to illustrate the invention, the parts and percentages being by weight, unless otherwise stated.

EXAMPLE 1

100 Parts of the dyestuff prepared according to Example 4 of the British Pat. No. 471,923 and having the formula mentined above were heated in an aqueous suspension for 1 hour at 80° C. In the course of this process the α-modification was converted into the stable β-modification. The dyestuff was filtered off and was ground with 70 parts of a condensation product of cresol, formaldehyde and sodium bisulfite as dispersing agent, 80 parts of ethylene-glycol and 2 parts of pentachlorophenol-sodium and water in the bead mill at room temperature, until the fine division was sufficient.

EXAMPLE 2

100 Parts of the moist dyestuff prepared according to Example 4 of British Pat. No. 471,923 were ground with 70 parts of lignin sulfonate, 0.4 part of a condensation product of cresol, formaldehyde, sodium bisulfite and a naphtholsulfonic acid at 80° C in a ball mill, until a sufficient fine division was obtained, and the preparation was dried in a spraying apparatus. After drying, the desired concentration of pure dyestuff was adjusted with the above-mentioned condensation product. The powder thus obtained was appropriate to meet all the requirements with regard to application.

EXAMPLE 3

100 Parts of the dyestuff obtained according to Example 4 of British Pat. No. 471,923 were stirred in an aqueous suspension which contained 10% by volume of ethanol, for 1 hour at a temperature of about 80° C. The dyestuff filtered off was ground according to the method described in Example 1. It yielded a liquid dyestuff preparation which had unobjectionable dyeing properties and a good stability.

EXAMPLE 4

100 Parts of the dyestuff obtained according to Example 4 of British Pat. No. 471,923 were stirred in an aqueous suspension containing 0.5% by volume of the tertiary organic phosphoric acid ester of lauryl alcohol with 2 moles of ethylene oxide, for 1 hour at a temperature of about 80° C. The dyestuff filtered off was ground, as has been described in Example 1. It yielded a liquid dyestuff preparation having unobjectionable dyeing properties and a good stability.

EXAMPLE 5

100 Parts of the dyestuff obtained according to Example 4 of British Pat. No. 471,923 were dried and were stirred in about 1,000 parts of glycol-monomethylether for 1 hour at a temperature of about 100° C. The dyestuff filtered off was washed with water and was ground, as has been described in Example 1. It yielded a liquid dyestuff preparation having unobjectionable dyeing properties and a good stability.

We claim:

1. The modification being stable under dyeing conditions of the dyestuff of the formula

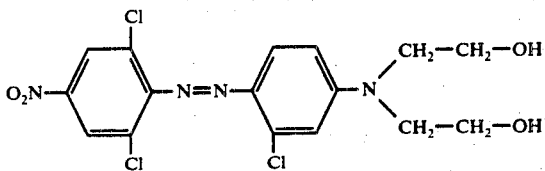

characterized by an X-ray diffraction diagram with characteristic reflexes at the following glance angles $\theta$ with the relative intensities as given below:

| [o] | 2.45 | 6.30 | 10.07 | 11.00 | 11.35 | 11.70 | 12.36 | 13.55 | 14.80 | 15.85 |
|---|---|---|---|---|---|---|---|---|---|---|
| | 63 | 100 | 30 | 48 | 83 | 88 | 86 | 59 | 52 | 34 |

2. Process for the preparation of the $\beta$-modification stable under dyeing conditions of the dyestuff of the formula as defined in claim 1, wherein the dyestuff of the formula

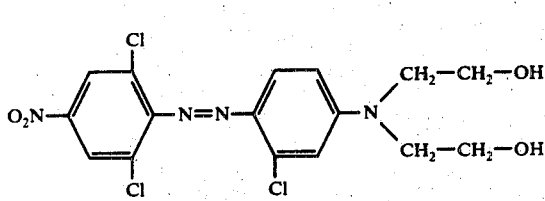

of the $\alpha$-modification being unstable under dyeing conditions and being characterized by an x-ray diffraction diagram with characteristic reflexes at the following glance angles with the intensities as given below:

| [o] | 2.55 | 5.60 | 6.20 | 7.65 | 12.35 | 13.40 |
|---|---|---|---|---|---|---|
| relative intensity | 78 | 40 | 59 | 30 | 38 | 100 | is (a) heated in an aqueous suspension to a temperature between 60° C and 150° C, or
(b) heated in an organic solvent to a temperature between 60° C and about 20° C below the boiling temperature of the organic solvent used, however, the upper limit of the temperature not exceeding 150° C, or
(c) ground at a temperature between about 80° C and 90° C in the presence of a dispersing agent, or
(d) dried at a temperature between 100° C and 120° C.

3. The process as claimed in claim 2, wherein the heating in an aqueous suspension to a temperature between 60° and 150° C is performed in the presence of a water-soluble organic solvent.

4. The process as claimed in claim 2, wherein the heating in an aqueous suspension to a temperature between 60° and 150° C is carried out in the presence of an anionic, cationic or non-ionic surface-active compound.

* * * * *